United States Patent
Ivanov et al.

(10) Patent No.: US 10,305,384 B2
(45) Date of Patent: *May 28, 2019

(54) POWER MANAGEMENT SYSTEM AND METHOD WITH ADAPTIVE NOISE CONTROL

(75) Inventors: Vadim V. Ivanov, Tucson, AZ (US); Harish Venkataraman, Wylie, TX (US); Daniel A. King, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 104 days.

This patent is subject to a terminal disclaimer.

(21) Appl. No.: 13/230,972

(22) Filed: Sep. 13, 2011

(65) Prior Publication Data

US 2013/0063111 A1   Mar. 14, 2013

(51) Int. Cl.
*H02M 3/158* (2006.01)
*H02M 1/00* (2006.01)

(52) U.S. Cl.
CPC .. *H02M 3/1588* (2013.01); *H02M 2001/0032* (2013.01); *H02M 2001/0045* (2013.01); *Y02B 70/1466* (2013.01); *Y02B 70/16* (2013.01)

(58) Field of Classification Search
CPC ........ H02M 1/36; H02M 3/07; H02M 3/1588; H02M 3/156; H02M 3/158; H02M 2001/007; H02M 2001/0032; H02M 2001/0035; H02M 2001/0045; H02M 3/1563; H02M 3/1582; H02M 2001/0067; H02M 2001/0074; H02M 2001/0077;
(Continued)

(56) References Cited

U.S. PATENT DOCUMENTS 5,553,296 A * 9/1996 Forrest et al. ................ 713/323
5,617,016 A * 4/1997 Borghi .................... G05F 1/575
                                                     323/282
(Continued)

FOREIGN PATENT DOCUMENTS

JP   WO 2010073401 A1 * 7/2010 ............... G05F 1/56

OTHER PUBLICATIONS

"A Low Voltage, Dynamic, Noninverting, Synchronous Buck-Boost Converter for Portable Applications," IEEE Transactions on Power Electronics, vol. 19, No. 2, Mar. 2004, pp. 443-452 (Sahu, et al.).
(Continued)

*Primary Examiner* — Gary L Laxton
*Assistant Examiner* — Carlos O Rivera-Perez
(74) *Attorney, Agent, or Firm* — John R. Pessetto; Charles A. Brill; Frank D. Cimino

(57) ABSTRACT

A method is provided. A first reference voltage during an idle mode is selected, and the first reference voltage is applied to a switched-mode converter. A first output voltage is then generated by the switched-mode converter from a power supply, and a capacitor is overcharged with the first output voltage. The first output voltage is regulated to generate a second output voltage during the idle mode. Then, a second reference voltage during a quiet mode, where the second reference voltage to the buck converter. During the quiet mode, a third output voltage is generated from the switched-mode converter and from discharging the overcharged capacitor, and the third output voltage is regulated to generate the second output voltage.

20 Claims, 3 Drawing Sheets

(58) Field of Classification Search
CPC ....... H02M 2003/1566; Y02B 70/1466; Y02B 70/16
USPC ........ 323/280–288, 901, 622, 904, 222–226, 323/266–275, 311–317, 351; 363/59, 363/123–127, 65, 67, 68; 345/211–215, 345/173–178, 204, 590, 690; 327/539, 327/541; 178/18.01–18.07; 320/107, 320/135; 713/300–340
See application file for complete search history.

(56) References Cited

U.S. PATENT DOCUMENTS

| | | | |
|---|---|---|---|
| 6,873,322 | B2 | 3/2005 | Hartular |
| 6,933,772 | B1 | 8/2005 | Banerjee et al. |
| 7,148,666 | B1 | 12/2006 | Tai et al. |
| 7,282,895 | B2 | 10/2007 | Thiele et al. |
| 2004/0178776 | A1* | 9/2004 | Hansen ................ H02M 3/156 323/266 |
| 2009/0230934 | A1* | 9/2009 | Hooijschuur ....... H02M 3/1582 323/282 |
| 2010/0110040 | A1* | 5/2010 | Kim ..................... G06F 3/0412 345/174 |
| 2010/0134040 | A1* | 6/2010 | Elder .......................... 315/294 |
| 2011/0254527 | A1* | 10/2011 | Saito ........................ G05F 1/56 323/284 |

OTHER PUBLICATIONS

"Low-Dropout Regulators With Adaptive Reference Control and Dynamic Push-Pull Techniques for Enhancing Transient Performance," IEEE Transactions on Power Electronics, vol. 24, No. 4, Apr. 2009, pp. 1016-1022 (Lin, et al.).
U.S. Appl. No. 13/134,762, filed Jun. 16, 2011.
U.S. Appl. No. 13/230,963, filed Sep. 13, 2011.

* cited by examiner

POWER MANAGEMENT SYSTEM AND METHOD WITH ADAPTIVE NOISE CONTROL

TECHNICAL FIELD

The invention relates generally to power management and, more particularly, to power management in a low noise environment.

BACKGROUND

There are some applications (like touch screen controllers and radios) that are sensitive to supply noise, substrate noise, and electromagnetic interference (EMI), but, in many cases, this sensitivity is not permanent. This sensitivity can be limited to "quiet" periods. For example, touch screen controllers can perform a capacitance measurement from a touch screen or touch panel during short intervals or periods (i.e., about 100-200 µs) that are separated by "idle" intervals or periods (where, for example, back-panel biasing for picture display can be performed). During these capacitance measurements periods, any noise in supply lines or in substrate can significantly alter the measurement results, decrease sensitivity or even make touch detection impossible.

These applications are also usually the battery-powered applications, so efficiency of the system power management can be very important so as to lengthen battery life. To achieve efficiency, direct current (DC)-to-DC converters are generally used to provide power for system operations (i.e., operation of the touch screen controller) from a battery, and, oftentimes, these DC-to-DC converters are integrated on the die with system (i.e., touch screen controller) in order to decrease size and lower cost. However, these DC-to-DC converters are usually switched-mode converters (i.e., buck or boost converters) because these types of converters are more efficient that linear regulators (i.e., low dropout regulators or LDOs). Each time these switched-mode converters switches, though, noise is generated due to current spike(s) in the substrate and in power supply buses, especially in the ground bus. Voltage ripples on the output storage capacitor can also be generated, typically in order of 5-10 mV, at the switching frequency (usually between 1 and 5 MHz).

A common solution, to this problem, however, is to employ an LDO in conjunction with a switched-mode converter. An example of a system 100 that employs a buck converter 102 in conjunction with an LDO 104 (which provides power from a battery BAT to a powered circuit 106) can be seen in FIG. 1. As shown, the buck converter 102 is generally comprised of a plant (which is generally a driver circuit 110, transistors Q1 and Q2, an inductor L, and a capacitor Cl) and a controller (which is generally an error amplifier 112, voltage source 114, a pulse width modulator or PWM 108, and a voltage divider Rl/R2), and the LDO 104 is generally comprised of an amplifier 116, a transistor Q3, a voltage source 118, and a capacitor C2. In this example, voltage source 114 provides a reference voltage $V_{DCREF}$ to error amplifier 112 such that voltage $V_{OUT}$ (which is generated by buck converter 102 from battery BAT) is greater than reference voltage $V_{LCOREF}$ (by, for example 200-300mV) in order to decrease the power loss in LDO 104 (which is proportional to its dropout). In some cases, LDO 104 can suppress supply ripple by 40-50 dB, but LDO 104 does not does cure caused by current pulses in the ground bus, EMI, and the substrate noise.

Thus, there is a need for an improved power management circuit.

Some other examples of conventional circuits are: U.S. Pat. Nos. 6,873,322; 6,933,772; 7,148,666; 7,282,895; Sahu et al., "A Low Voltage, Dynamic, Noninverting, Synchronous Buck-Boost Converter for Portable Applications," IEEE Trans. on Power Electronics, Vol. 19, No. 2, March 2004, pp. 443-452; and Lin et al., "Low-Dropout Regulators With Adaptive Reference Control and Dynamic Push-Pull Techniques for Enhancing Transient Performance," IEEE Trans. on Power Electronics, Vol. 24, No. 4, April 2009, pp. 1016-1022.

SUMMARY

An embodiment of the present invention, accordingly, provides an apparatus. The apparatus comprises a switched-mode converter having: a plant that receives an input current and an input voltage and that generates a first output voltage and a first output current, wherein the plant includes a capacitor; a first controller that is coupled to the plant and that controls the plant; a switch network that is coupled to the first controller and that receives a first reference voltage and a second reference voltage, wherein the first reference voltage is greater than the second reference voltage; a second controller that provides a control signal to the switch network, wherein the second controller enables the switch network to provide the second reference voltage to the first controller during an idle mode so as to overcharge the capacitor, and wherein the second controller enables the switch network to provide the first reference voltage to the first controller during a quiet mode; and a linear regulator that is coupled to the plant so as to receive the first output voltage and output current and to generate a second output current and a second output voltage.

In accordance with an embodiment of the present invention, the capacitor further comprises a first capacitor, and wherein the linear regulator further comprises a low dropout regulator (LDO) having: a transistor having a first passive electrode, a second passive electrode, and a control electrode, wherein the first passive electrode of the transistor is coupled to the plant; an amplifier having a first input terminal, a second input terminal, and an output terminal, wherein the first input terminal of the amplifier receives a third reference voltage, and wherein the second input terminal of the amplifier is coupled to the second passive electrode of the transistor, and wherein the output terminal of the amplifier is coupled to the control electrode of the transistor; and a second capacitor that is coupled to the second passive electrode of the transistor.

In accordance with an embodiment of the present invention, the transistor further comprises a first transistor, and wherein the plant further comprises: a second transistor having a first passive electrode, a second passive electrode, and a control electrode, wherein the first passive electrode of the second transistor receives the input current and voltage; a third transistor having a first passive electrode, a second passive electrode, and a control electrode, wherein the first passive electrode of the third transistor is coupled to the second passive electrode of the second transistor at a switching node; an inductor that is coupled between the switching node and an output node, wherein the first output current and voltage are provided at the output node, and wherein the first capacitor is coupled to the output node; and a driver circuit that is coupled to the control electrodes of the second and third transistors.

In accordance with an embodiment of the present invention, the first controller further comprises: a voltage divider that is coupled to the output node; an error amplifier that is coupled to the voltage divider and the switch network; and a pulse width modulator (PWM) that is coupled to the error amplifier and the driver circuit.

In accordance with an embodiment of the present invention, the switch network further comprises: a first switch that is coupled to the error amplifier, that receives the first reference voltage, and that is controlled by the second controller; and a second switch that is coupled to the error amplifier, that receives the second reference voltage, and that is controlled by the second controller.

In accordance with an embodiment of the present invention, an apparatus is provided. The apparatus comprises a power supply; a touch screen controller having an idle mode and a quiet mode, wherein the touch screen controller is configured to perform a measurement during the quiet period; a switched-mode converter having: a plant that is coupled to the power supply and that generates a first output voltage and a first output current, wherein the plant includes a capacitor; a first controller that is coupled to the plant and that controls the plant; a switch network that is coupled to the first controller and that receives a first reference voltage and a second reference voltage, wherein the second reference voltage is greater than the first reference voltage; a second controller that is coupled to the touch screen controller and that provides a control signal to the switch network, wherein the second controller enables the switch network to provide the second reference voltage to the first controller during the idle mode so as to overcharge the capacitor, and wherein the second controller enables the switch network to provide the first reference voltage to the first controller during the quiet mode; and a linear regulator that is coupled to the plant so as to receive the first output voltage and output current and to generate a second output current and a second output voltage.

In accordance with an embodiment of the present invention, the first transistor further comprises a PMOS transistor, and wherein the second and third transistors further comprise first and second NMOS transistors.

In accordance with an embodiment of the present invention, the power supply is a battery.

In accordance with an embodiment of the present invention, the first and second reference voltages 400 mV and 250 mV, respectively.

In accordance with an embodiment of the present invention, a method is provided. The method comprises selecting a first reference voltage during an idle mode; applying the first reference voltage to a switched-mode converter during the idle mode; generating a first output voltage by the switched-mode converter from a power supply during the idle mode; overcharging a capacitor during the idle mode with the first output voltage; regulating the first output voltage to generate a second output voltage during the idle mode; selecting a second reference voltage during a quiet mode; applying the second reference voltage to the buck converter during the quiet mode; generating, during the quiet mode, a third output voltage from the switched-mode converter and from discharging the overcharged capacitor; and regulating the third output voltage to generate the second output voltage.

In accordance with an embodiment of the present invention, the switched-mode converter is a buck converter.

In accordance with an embodiment of the present invention, the power supply further comprises a battery.

In accordance with an embodiment of the present invention, the method further comprises: generating a control signal by a touch screen controller that indicates the idle mode or the quiet mode; using the control signal to perform the steps of selecting.

In accordance with an embodiment of the present invention, the method further comprises performing a measurement by the touch screen controller during the quiet mode.

In accordance with an embodiment of the present invention, the first and second reference voltages are 400 mV and 250 mV, respectively.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
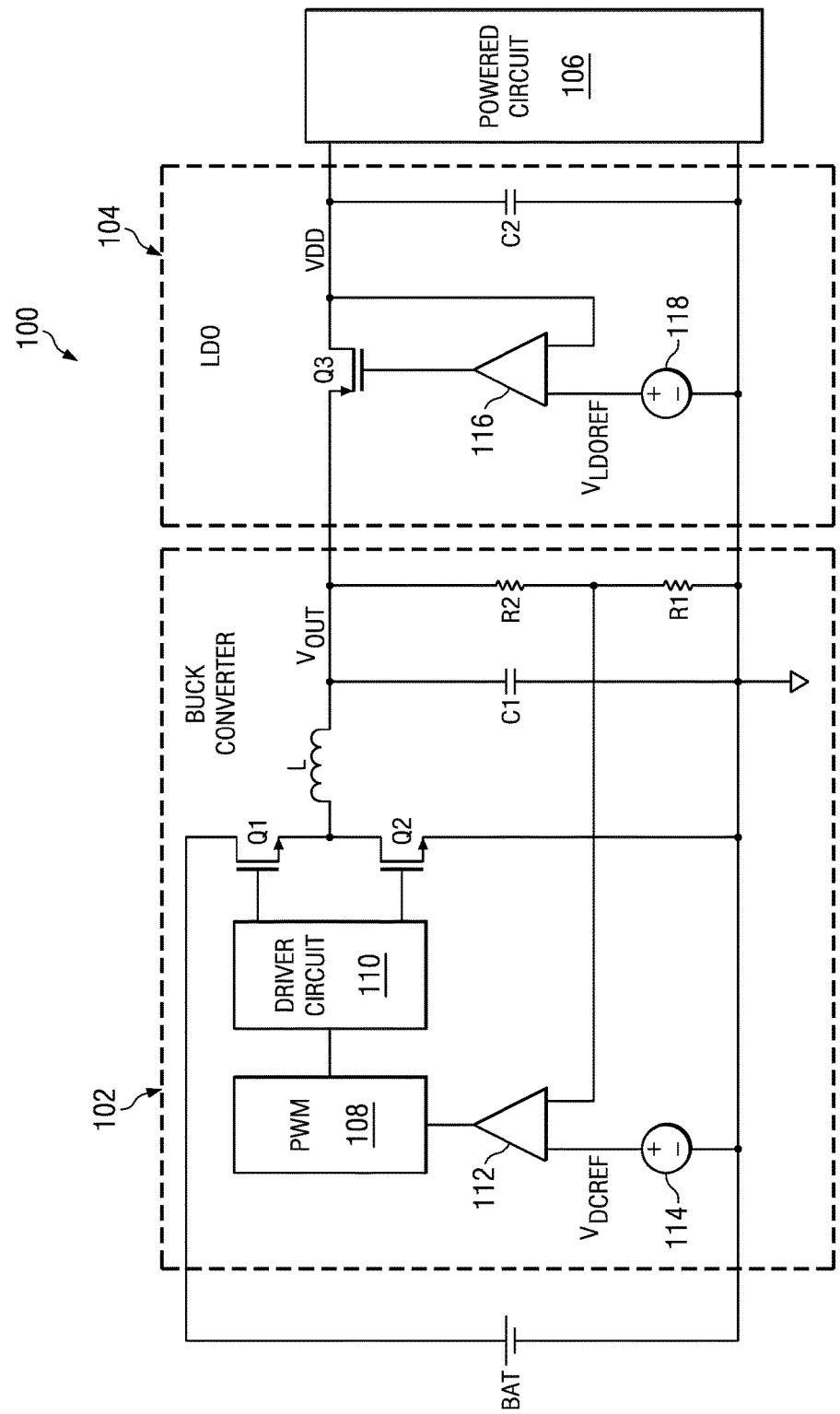
FIG. 1 is a diagram of an example of a conventional system.

Refer now to the drawings wherein depicted elements are, for the sake of clarity, not necessarily shown to scale and wherein like or similar elements are designated by the same reference numeral through the several views.

Figure 2:
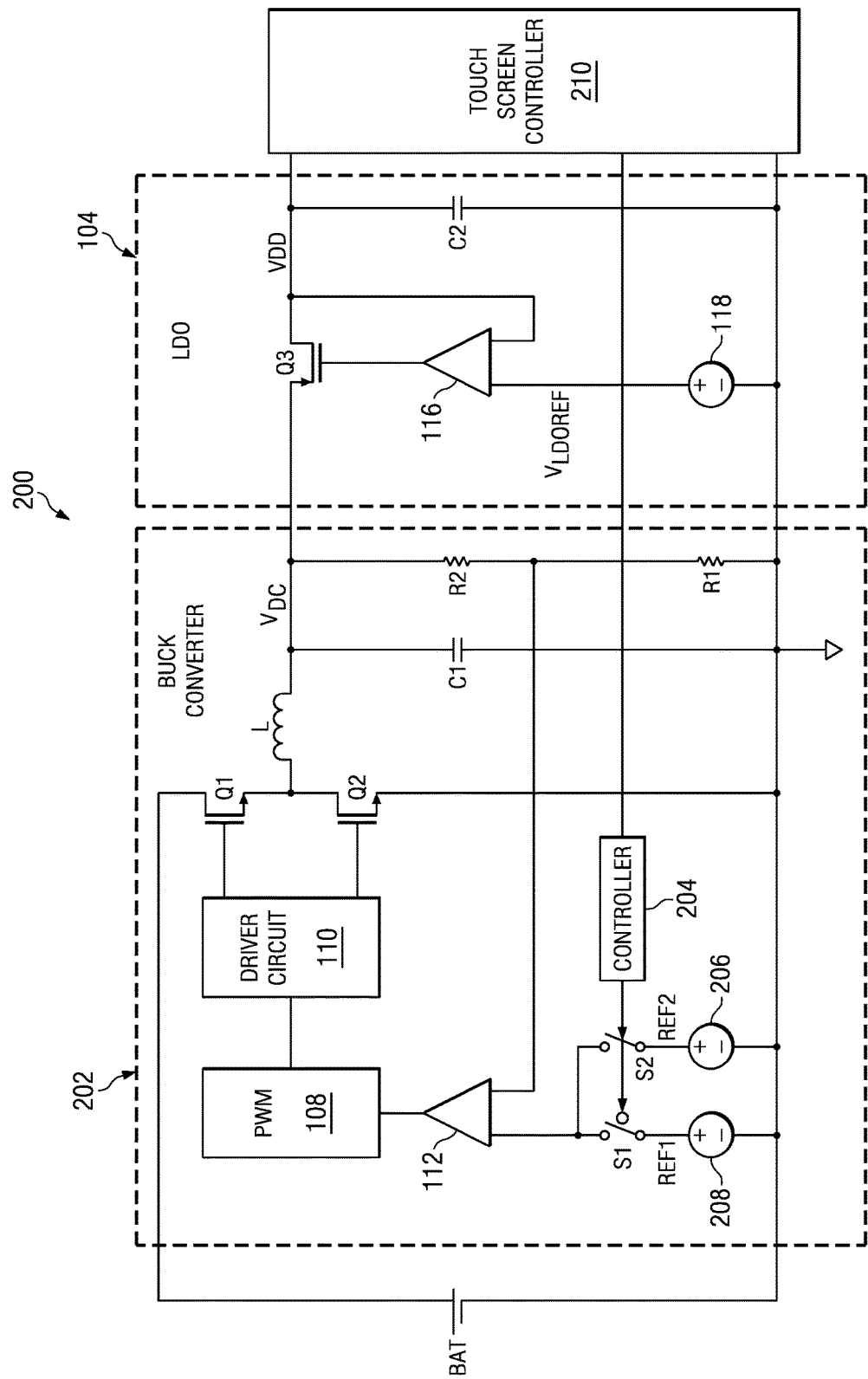
FIG. 2 is a diagram of an example of a system in accordance with an embodiment of the present invention.

Turning to FIG. 2, an example of a system 200 in accordance with an embodiment of the present invention can be seen. As shown, system 200 is similar in construction to system 100, except that buck converter 202 generally includes a switch network (which generally comprises switches S1 and S2), a controller 204, and voltage sources 206 and 208. Additionally, the buck converter 202 and LDO 104 are used (in this example) to power a touch screen controller 210 from a battery BAT. This configuration for system 200 (and for buck converter 202, in particular) exploits operation of the measurement system of touch screen controller 210; touch screen controller 210 performs capacitance measurements during a quite period (which can, for example, be about 100-200 µs in length) that are separated idle periods (which can, for example, be 10-30 µs or larger in length).

Figure 3:
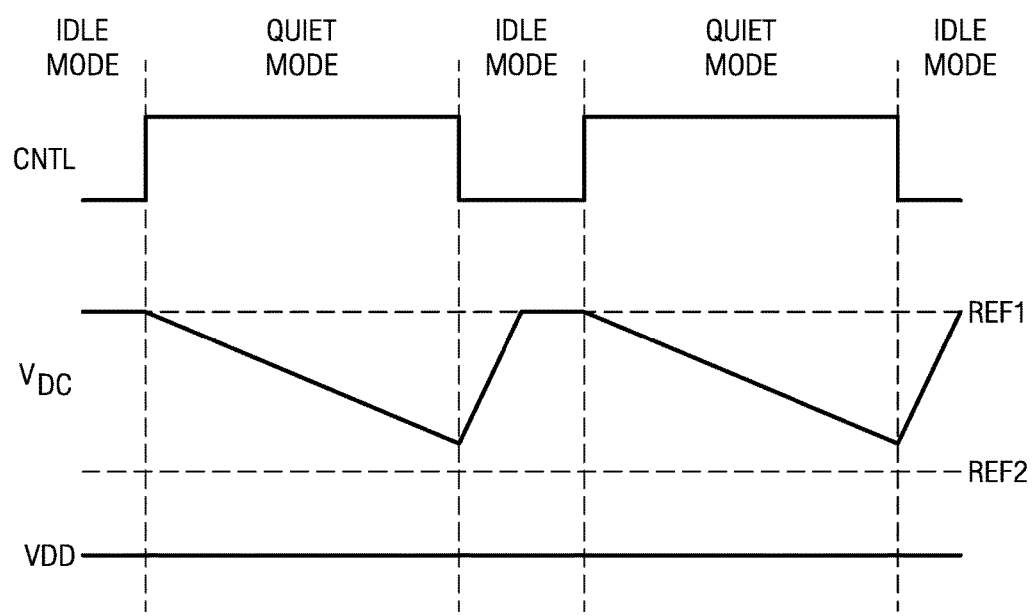
FIG. 3 is a timing diagram depicting an example operation of the system of FIG. 2.

As shown in FIG. 3, controller 204 is able to change the operational mode of converter 202 to take advantage of the operation of the measurement system of touch screen controller 210. During idle period, the controller 204 configures the switch network operate in an idle mode where reference voltage REF1 is provided to error amplifier 112 (i.e., switch S1 is "on" and switch S2 is "off"). In order to perform this task, controller 204 can either include logic so as to generate control signal CNTL or can be passive elements (i.e., wires or conductors) that use one ore more signals from touch screen controller 210. In this idle mode, the output voltage $V_{DC}$ is increased to voltage REF1 (which can, for example, be 400 mV) through the switching of buck converter 202. The output voltage $V_{DC}$ can then be further regulated by LDO 104 to generate voltage VDD. Additionally, because the voltage $V_{DC}$ is high or large, capacitor C1 is overcharged in this idle mode. Then, during the quiet period, the controller 204 configures the switch network to operate in a quiet mode where reference voltage REF2 is provided to error amplifier 112 (i.e., switch S2 is "on" and switch S1 is "off"). Because the capacitor C1 has been overcharged from the previous idle period, the charge accumulated on the capacitor C1 is used to provide a current (and voltage) to LDO 104, so the buck converter 202 discontinues switching until voltage $V_{DC}$ (which is supplied by capacitor C1) drops below the switching threshold (i.e., $V_{DC}$–VDD=250 mV). Thus, as long as capacitor C1 is sufficiently large (which depends on the length of the quiet period and current load), no switching events in buck converter 202 should occur during the quiet period. Additionally, if the load (from touch screen controller 210) increases that so as to cause the voltage $V_{DC}$ to drop below the switching threshold, the buck converter 202 can begin switching (which should be sufficiently small in most cases so as to not be catastrophic to the operation of controller 210).

There are also several alternative arrangements for the system 200. In one example, buck converter 202 can be replaced with a boost converter or another switched-mode converter. In another example, touch screen controller 210 can be replaced with a radio or other sensitive circuitry. As another example, transistor Q2 can be replaced by a diode when the switched-mode converter (i.e., 202) is a buck converter, and transistor Q1 can be replaced by a diode when the switched-mode converter (i.e., 202) is a boost converter

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
a first controller having an idle mode and a quiet mode, wherein the first controller is configured to perform a measurement during the quiet mode;
a switched-mode converter coupled to the first controller, the switched-mode converter having:
 a plant that receives an input current and an input voltage and that generates a first output voltage and a first output current, wherein the plant includes a capacitor;
 a second controller that is coupled to the plant and that controls the plant;
 a switch network that is coupled to the second controller and that receives a first reference voltage and a second reference voltage, wherein the second reference voltage is greater than the first reference voltage; and
 a third controller that provides a control signal to the switch network, wherein the third controller enables the switch network to provide the second reference voltage to the second controller in response to the first controller operating in the idle mode, and enables the switch network to provide the first reference voltage to the second controller in response to the first controller operating in the quiet mode, the apparatus further comprising:
a linear regulator that is coupled to the plant to receive the first output voltage and the first output current and to generate a second output current and a second output voltage;
wherein when the first output voltage is greater than the first reference voltage during the quiet mode, the plant discontinues switching.

2. The apparatus of claim 1, wherein the capacitor further comprises a first capacitor, and wherein the linear regulator further comprises a low dropout regulator (LDO) having:
a transistor having a first passive electrode, a second passive electrode, and a control electrode, wherein the first passive electrode of the transistor is coupled to the plant;
an amplifier having a first input terminal, a second input terminal, and an output terminal, wherein the first input terminal of the amplifier receives a third reference voltage, and wherein the second input terminal of the amplifier is coupled to the second passive electrode of the transistor, and wherein the output terminal of the amplifier is coupled to the control electrode of the transistor; and
a second capacitor that is coupled to the second passive electrode of the transistor.

3. The apparatus of claim 2, wherein the transistor is a first transistor, and wherein the plant further comprises:
a second transistor having a first passive electrode, a second passive electrode, and a control electrode, wherein the first passive electrode of the second transistor receives the input current and the input voltage;
a third transistor having a first passive electrode, a second passive electrode, and a control electrode, wherein the first passive electrode of the third transistor is coupled to the second passive electrode of the second transistor at a switching node;
an inductor that is coupled between the switching node and an output node, wherein the first output current and the first output voltage are provided at the output node, and wherein the first capacitor is coupled to the output node; and
a driver circuit that is coupled to the control electrodes of the second and third transistors.

4. The apparatus of claim 3, wherein the second controller further comprises:
a voltage divider that is coupled to the output node;
an error amplifier that is coupled to the voltage divider and the switch network; and
a pulse width modulator (PWM) that is coupled to the error amplifier and the driver circuit.

5. The apparatus of claim 4, wherein the switch network further comprises:
a first switch that is coupled to the error amplifier, that receives the first reference voltage, and that is controlled by the third controller; and
a second switch that is coupled to the error amplifier, that receives the second reference voltage, and that is controlled by the third controller.

6. The apparatus of claim 1, wherein the third controller is coupled to a radio.

7. An apparatus comprising:
a power supply;
a touch screen controller having an idle mode and a quiet mode, wherein the touch screen controller is configured to perform a measurement during the quiet mode;
a switched-mode converter having:
a plant that is coupled to the power supply and that generates a first output voltage and a first output current, wherein the plant includes a capacitor;
a first controller that is coupled to the plant and that controls the plant;
a switch network that is coupled to the first controller and that receives a first reference voltage and a second reference voltage, wherein the second reference voltage is greater than the first reference voltage; and
a second controller that is coupled to the touch screen controller and that provides a control signal to the switch network, wherein the second controller enables the switch network to provide the second reference voltage to the first controller in response to the touch screen controller operating in the idle mode, and wherein the second controller enables the switch network to provide the first reference voltage to the first controller in response to the touch screen controller operating in the quiet mode, the apparatus further comprising:
a linear regulator that is coupled to the plant so as to receive the first output voltage and the first output current and to generate a second output current and a second output voltage;
wherein when the first output voltage is greater than the first reference voltage during the quiet mode, the plant discontinues switching.

8. The apparatus of claim 7, wherein the capacitor further comprises a first capacitor, and wherein the linear regulator further comprises an LDO having:
a transistor having a first passive electrode, a second passive electrode, and a control electrode, wherein the first passive electrode of the transistor is coupled to the plant;
an amplifier having a first input terminal, a second input terminal, and an output terminal, wherein the first input terminal of the amplifier receives a third reference voltage, and wherein the second input terminal of the amplifier is coupled to the second passive electrode of the transistor, and wherein the output terminal of the amplifier is coupled to the control electrode of the transistor; and
a second capacitor that is coupled to the second passive electrode of the transistor.

9. The apparatus of claim 8, wherein the transistor is a first transistor, and wherein the plant further comprises:
a second transistor having a first passive electrode, a second passive electrode, and a control electrode, wherein the first passive electrode of the second transistor receives the input current and the input voltage;
a third transistor having a first passive electrode, a second passive electrode, and a control electrode, wherein the first passive electrode of the third transistor is coupled to the second passive electrode of the second transistor at a switching node;
an inductor that is coupled between the switching node and an output node, wherein the first output current and the first output voltage are provided at the output node, and wherein the first capacitor is coupled to the output node; and
a driver circuit that is coupled to the control electrodes of the second and third transistors.

10. The apparatus of claim 9, wherein the first controller further comprises:
a voltage divider that is coupled to the output node;
an error amplifier that is coupled to the voltage divider and the switch network; and
a PWM that is coupled to the error amplifier and the driver circuit.

11. The apparatus of claim 10, wherein the switch network further comprises:
a first switch that is coupled to the error amplifier, that receives the first reference voltage, and that is controlled by the second controller; and
a second switch that is coupled to the error amplifier, that receives the second reference voltage, and that is controlled by the second controller.

12. The apparatus of claim 11, wherein the first transistor is a PMOS transistor, and wherein the second and third transistors are first and second NMOS transistors.

13. The apparatus of claim 12, wherein the power supply is a battery.

14. The apparatus of claim 13, wherein the first and second reference voltages 250 mV and 400 mV, respectively.

15. A method comprising:
selecting a first reference voltage during an idle mode;
applying the first reference voltage to a switched-mode converter during the idle mode;
generating, by the switched-mode converter, a first output voltage based on the first reference voltage during the idle mode;
regulating the first output voltage to generate a second output voltage during the idle mode;
selecting a second reference voltage during a quiet mode, the second reference voltage being less than the first reference voltage;
applying the second reference voltage to the switched-mode converter during the quiet mode;
discontinuing switching of the switch-mode converter when the first output voltage is greater than the second reference voltage; and
performing, with a touch screen controller, a measurement during the quiet mode.

16. The method of claim 15, wherein the switched-mode converter is a buck converter.

17. The method of claim 16, wherein power supply further comprises a battery.

18. The method of claim 17, wherein the method further comprises:
generating a control signal by the touch screen controller that indicates the idle mode or the quiet mode; and
using the control signal to perform the steps of selecting.

19. The method of claim 18, wherein the method further comprises performing the measurement by the touch screen controller during the quiet mode.

20. The method of claim 19, wherein the first and second reference voltages are 400 mV and 250 mV, respectively.

* * * * *